*(12)* United States Patent
Raaijmakers et al.

(10) Patent No.: US 7,728,124 B2
(45) Date of Patent: Jun. 1, 2010

(54) METHOD AND MANUFACTURE OF CARBOXYALKYLINULIN

(75) Inventors: Harry W. C. Raaijmakers, Roosendaal (NL); Ernst Neeleman, Ridderkerk (NL)

(73) Assignees: Koninklijke Cooperatie Consun U.A., Breda (NL); Solutia Europe N.V./S.A., Brussels (BE)

( * ) Notice: Subject to any disclaimer, the term of this patent is extended or adjusted under 35 U.S.C. 154(b) by 475 days.

(21) Appl. No.: 10/587,878

(22) PCT Filed: Jan. 28, 2005

(86) PCT No.: PCT/BE2005/000011

§ 371 (c)(1),
(2), (4) Date: Apr. 12, 2007

(87) PCT Pub. No.: WO2005/073256

PCT Pub. Date: Aug. 11, 2005

(65) Prior Publication Data

US 2007/0225483 A1 Sep. 27, 2007

(51) Int. Cl.
*C07H 15/00* (2006.01)
*C07H 15/06* (2006.01)

(52) U.S. Cl. .................................... 536/119
(58) Field of Classification Search ............... None
See application file for complete search history.

(56) References Cited

U.S. PATENT DOCUMENTS 4,507,474 A * 3/1985 Raehse et al. ............... 536/97

OTHER PUBLICATIONS

Verraest et al. Carbohydrate Research 271 (1995) 101-112.*

* cited by examiner

*Primary Examiner*—Shaojia Anna Jiang
*Assistant Examiner*—Layla Bland
(74) *Attorney, Agent, or Firm*—Hodes, Pessin & Katz, P.A.

(57) ABSTRACT

A method for the manufacture of carboxyalkylinulin is disclosed comprising preparing an aqueous medium containing dispersed therein a halogenoalkylcarboxylate, adding to the carboxylate containing medium, under substantially neutral pH conditions, an inulin followed by heating this mixture to a temperature in the range of from 60° C. to 90° C. and proceeding with the reaction at alkaline conditions, pH 8-12, while simultaneously adding additional halogenoalkylcarboxylate and alkalihydroxide. The carboxyalkylinulin so formed is recovered in a manner known per sé.

10 Claims, No Drawings

METHOD AND MANUFACTURE OF CARBOXYALKYLINULIN

This invention relates to a method for the manufacture of carboxyalkylinulin by reacting inulin with monochlorocarboxylic acid under predominantly alkaline conditions. The inventive arrangement amounts to a multi-step process comprising dispersing into an aqueous medium from about 25 to about 150 molar-% of the halogenoalkylcarboxylate, expressed in relation to the molar amount of monosaccharide units in the inulin, followed by adding the inulin to the halogenoalkylcarboxylate medium to thus yield a slurry, having a pH in the range of from 5 to 8, containing from about 25% to about 70% of inulin, expressed in relation to the amount of water (100%) in the slurry. The slurry so obtained is thereafter heated to a temperature from about 60° C. to about 90° C., followed by concurrently adding further halogenoalkylcarboxylate to yield a molar ratio of halogenoalkylcarboxylate: inulin of from 1.0 to 5.0, and an alkaline hydroxide in a quantity equimolar to the total level of halogenoalkylcarboxylate, plus an additional amount of the alkaline hydroxide of from 10 to 50 molar-%, expressed in relation to the molar amount of monosaccharide units in the inulin (100%) to yield a reaction mixture pH in the range of from 8 to 12, measured at the reaction mixture temperature (60° C. to 90° C.). The reaction is continued at the reaction temperature, after all the reagents have been added, for a period up to 90 minutes. The carboxyalkylinulin is subsequently recovered in a manner known per sé.

The inventive method proceeds smoothly and gradually, while maintaining a controllably low viscosity during the total reaction, particularly in the presence of high levels of inulin, and therefore substantially improves and facilitates the course of the reaction and the yield of the reaction product.

The prior art relating to carboxyalkylinulins as such and methods for the manufacture thereof is fairly substantial and diverse. Carboxymethylinulin salts have been known for a long time, see e.g. Czech patent No 90980 of 1958/1959. EP 0.733.073 describes a method for the manufacture of carboxymethylinulin by reacting, under alkaline conditions, inulin and sodiumchloroacetate. The technology is, inter alia, subject to substantial viscosity difficulties which can lead to low conversions and undesirable by-products. Chien, J. Immunol. Methods 26 (1979) 39-46, pertains to the preparation of carboxymethylinulin (CMI) thereby using a six-fold molar excess of sodium chloroacetate in dilute alkaline solution at relatively low temperature. The CMI so prepared has a very low degree of substitution and the method is cumbersome and not suitable for any economically viable undertaking. Known CMI manufacturing technologies are known to be economically deficient and cannot be utilized for preparing carboxyalkylinulins with acceptable yields, purities and degrees of conversion. Viscosity, in particular gelling, problems constitute a major obstacle towards securing an acceptable manufacturing method.

It is therefore a major object of this invention to provide a method for preparing carboxyalkylinulins with acceptable yields, purity and degrees of conversion having a degree of substitution (DS) above about 1.5 up to about 3. It is another object of this invention to provide a carboxyalkylinulin manufacturing method which, while being conducted in the presence of high levels of inulin reactant, is not subject to viscosity, in particular gelling, problems, which are known to diminish the reaction completeness, and can lead to the formation of undesirable by-products and usually deliver reduced yields of the carboxyalkylinulin reaction product.

The foregoing and other objects can now be achieved with the aid of a narrowly-defined multi-step method arrangement.

The present invention resides in the discovery that carboxyalkylinulins can be manufactured under alkaline conditions characterized in that:

(a) from 25 to 150 molar-%, expressed in relation to the molar amount of monosaccharide units in the inulin (100%), of an X-halogenoalkylcarboxylate, wherein the halogen is selected from chlorine, bromine and iodine, the alkyl chain contains from 1 to 5 carbon atoms, and X is an alkaline ion from the group of sodium and potassium, is dispersed into an aqueous medium;

(b) adding to and dispersing into the halogenoalkylcarboxylate medium (a) the inulin to yield a slurry, having a pH, measured on the slurry at a temperature of from 20° C. to 70° C., in the range of from about 5 to 8, containing from about 25% to about 70% by weight of the inulin, expressed in relation to the amount of water (100%) in the slurry;

(c) heating the slurry (b) to a temperature from about 60° C. to 90° C. followed by concurrently adding additional halogenoalkylcarboxylate, to yield a molar ratio of halogenoalkylcarboxylate:inulin of from 1.0 to 5.0, and an alkaline hydroxide, from the group of sodium and potassium hydroxide, in a quantity equimolar to the total level of halogenoalkylcarboxylate, plus an additional amount of the alkaline hydroxide of from 10 to 50 molar-%, expressed in relation to the molar amount of monosaccharide units in the inulin (100%), to yield a reaction mixture pH in the range of from 8 to 12, measured at the reaction mixture temperature (60° C. to 90° C.);

(d) continuing the reaction, after all the reagents have been added, for a period up to about 90 minutes, at the reaction temperature; and (e) recovering the carboxyalkylinulin in a manner known per sé.

In preferred aspects herein, the molar ratio of halogenoalkylcarboxylate:inulin is in the range of from 1.5 to 4.5, and the reaction is continued for a period of 20 to 60 minutes after all the ingredients have been added. The alkyl moiety, in the carboxyalkylinulin, is preferably represented by a chain having from 1 to 3 carbon atoms, most preferably methyl.

The term "%" or "percent" as used throughout the application means, unless defined differently, "% by-weight" or "percent by-weight". The terms "fructan" and "inulin" are, unless specifically stated differently, used interchangeably. The terms "dispersion" and "solution" are used interchangeably and represent, as one can appreciate, usually mixed dispersions/solutions or possibly individual solutions or dispersions.

The claimed invention concerns a method for the manufacture of carboxyalkylinulin. The alkyl moiety is generally represented by a chain having from 1 to 5, more preferably from 1 to 3 carbon atoms, most preferably methyl.

A reaction medium (a) is prepared by dispersing from 25 to 150, preferably from 70 to 100 molar-%, expressed in relation to the molar amount of monosaccharide units in the inulin (100%) of an X-halogenoalkylcarboxylate, wherein the halogen is selected from chlorine, bromine and iodine, the alkyl contains from 1 to 5 carbon atoms, and X is an alkaline ion from the group of sodium and potassium, into an aqueous medium followed by adding to and dispersing into the carboxylate medium of step (a) the inulin to yield a slurry having a pH, measured on the slurry at a temperature of from 20° C. to 70° C., in the range of from 5 to 8, preferably 6 to 8, containing from about 25 to about 70, preferably from about 40 to 60% of the inulin, expressed in relation to the amount of water (100%) in the slurry.

Fructans are oligo- and polysaccharides, which have a majority of anhydrofructose units. The fructans can have a polydisperse chain length distribution and can be straight- or branched-chain. Preferably, the fructan contains mainly β-2,1 bonds. The fructans can be products obtained directly from a vegetable source or other sources and products in which the average chain length has been modified, increased or reduced, by fractionation, enzymatic synthesis or hydrolysis. The fructans have an average chain length (degree of polymerization; DP) of at least 3 to about 1000. Preferably the average chain length is from 3 to 60, in particular from 5 to 30 monosaccharide units. Preferred inulin for use is represented by β-2, 1-fructan or a modified inulin. Modified fructans, suitable for use within the claimed technology, can be represented by inulins with enzymatically increased chain length, fructan hydrolysis products having shortened chains and fractionated products having a modified chain length. Fractionation of inulins can be achieved, for example, by means of known technologies including low temperature crystallization (see WO 94/01849), column chromatography (see WO 94/12541), membrane filtration (see EP-A-0440074, EP-A-0627490) or selective precipitation with alcohol. Hydrolysis to yield shorter fructans can be carried out, for example, enzymatically (endo-insulase), chemically (water and acid) or by heterogeneous catalysis (acid ion-exchange resins). Reduced, oxidized, hydroxyalkylated and/or cross-linked fructans can also represent suitable starting materials.

The aqueous medium, into which the X-halogenoalkylcarboxylate is dispersed in step (a), can be represented by water or by an aqueous dispersion containing up to 35%, in one preferred execution from about 10% to about 30% of the inulin (expressed in relation to the aqueous medium). The use of aqueous inulin solutions as the aqueous medium in step (a) can be in order depending upon the inulin starting material, which can conveniently be made available as a solution.

The slurry (b) is subsequently heated to a temperature in the range of from about 60° C. to about 90° C., preferably from about 60° C. to about 70° C., followed by substantially concurrently adding additional halogenoalkylcarboxylate to yield a molar ratio of halogenoalkylcarboxylate:inulin of from 1.0 to 5.0, preferably of from 1.5 to 4.5, and an alkaline hydroxide, from the group of sodium and potassium hydroxide, in a quantity equimolar to the total level of halogenoalkylcarboxylate, plus an additional amount of the alkaline hydroxide in an amount of from 10 to 50 molar-%, expressed in relation to the molar amount (100%) of monosaccharide units in the inulin, to thus yield a reaction mixture pH in the range of from about 8 to 12, preferably from about 9.5 to 11.5 measured at the reaction temperature (60° C. to 90° C.).

The reaction is continued, at the reaction temperature, after all the reactants/ingredients have been added (c), for a period up to 90 minutes, preferably of from 30 to 60 minutes.

The pH, in step (b) measured on the slurry at a temperature of from 20° C. to 70° C., is in the range of from 5 to 8, preferably 6 to 8 defines, within the context of the claimed method arrangement, since undesired inulin degradation can occur at a pH lower than 5 and hydrolysis of the halogenoalkylcarboxylate can occur at a pH greater than 8.

The carboxyalkylinulin reaction product can be recovered, as such or purified, with the aid of conventional methods well known in this domain of the technology. Suitable examples of such purification methods include nanofiltration.

The following Examples illustrate the invention and demonstrate the benefits attached to the claimed method arrangement.

EXAMPLE 1

Inulin (500 g) was dispersed into a stirred solution of sodium monochloroacetate (SMCA, 360 g) in water (500 g). This dispersion was under stirring gradually warmed to 70° C. The viscosity was measured at various temperatures thereby using a Brookfield, probe LV2, 60 rpm. A comparative experiment was carried out by adding inulin (500 g) to water (500 g). The comparative viscosity measurements were as follows.

| Temperature (° C.) | Example η | Comparative η |
|---|---|---|
| 20 | 533 | paste |
| 30 | 288 | paste |
| 40 | 154 | more than 16000 |
| 50 | 101 | 10000 |
| 60 | 85 | 4000 |
| 70 | 64 | 1000 |

Viscosity measurements in: mPa/s.

These data show the reaction-friendly virtually-constant viscosity in accordance with the invention versus the formation of kneadable reaction mixtures which yield very-low generally unacceptable conversion rates.

EXAMPLE 2

Inulin (150 g) was added to a stirred solution of SMCA (100 g) in water (200 g) at room temperature. The resulting slurry was then heated to 70° C. An aqueous solution of sodium hydroxide (50%, 215 g) and SMCA (200 g) were gradually added to the reaction mixture having a temperature of 70° C. The reaction was, after all the reagents were added, continued at the reaction temperature for a period of 90 minutes. Carboxymethylinulin (DS 1.9, 765 g, 29% active salt) was formed with a yield of 75%.

EXAMPLE 3

Inulin (150 g) was added to a stirred solution of SMCA (80 g) in water (112 g) at room temperature. The resulting slurry was then heated to 75° C. An aqueous solution of sodium hydroxide (50%, 306 g) and SMCA (347 g) was gradually added to the inulin slurry having a temperature of 75° C. The reaction was, after all the reagents were added, continued at the reaction temperature for a period of 90 minutes. Carboxymethylinulin (DS 2.5; 838 g; 34% active salt) was formed with a yield of 66%.

EXAMPLE 4

SMCA (300 g) was added, under stirring, to a slurry (650 g) containing 30 wt-% inulin at 60° C. Inulin powder (360 g) was thereafter added to the inulin slurry until an inulin concentration of 55%, with respect to the amount of water in the slurry, was reached. The reaction mixture was then heated to 80° C. and one equivalent of sodium hydroxide (200 g, 50% aqueous solution), with respect to the amount of SMCA in the reaction mixture, was added while maintaining the reaction temperature at 80° C. Then SMCA (425 g) was added together with aqueous sodium hydroxide (50%, 336 g). The reaction was, after all the reagents were added, continued at the reaction temperature for a period of 90 minutes. Carboxymethylinulin (DS 1.46, 2270 g, 37% active salt) was formed with a yield of 81%.

The invention claimed is:

1. A method for the manufacture of carboxyalkylinulin by reacting inulin with a halogenoalkylcarboxylate under alkaline conditions, characterized in that:
   (a) from 25 to 150 molar-%, expressed in relation to the molar amount of monosaccharide units in the inulin (100%), of the X-halogenoalkylcarboxylate, wherein the halogen is selected from chlorine, bromine and iodine, the alkyl chain contains from 1 to 5 carbon atoms, and X is an alkaline ion from the group of sodium and potassium, is dispersed into an aqueous medium, the aqueous medium containing optionally up to 35% by weight of inulin;
   (b) adding to and dispersing into the halogenoalkylcarboxylate medium (a) the inulin to yield a slurry, having a pH, measured on the slurry at a temperature of from 20° C. to 70° C., in the range of from about 5 to 8, containing from about 25% to about 70% by weight of the inulin, expressed in relation to the amount of water (100%-by weight) in the slurry;
   (c) heating the slurry (b) to a temperature from about 60° C. to about 90° C., followed by concurrently adding additional halogenoalkylcarboxylate, to yield a molar ratio of halogenoalkylcarboxylate:inulin of from 1.0 to 5.0, and an alkaline hydroxide, from the group of sodium and potassium hydroxide, in a quantity equimolar to the total level of halogenoalkylcarboxylate, plus an additional amount of the alkaline hydroxide of from 10 to 50 molar-%, expressed in relation to the molar amount of fructose units in the inulin (100%), to yield a reaction mixture pH in the range of from 8 to 12, measured at the reaction temperature (60° C. to 90° C.);
   (d) continuing the reaction, after all the reagents have been added, for a period up to 90 minutes, at the reaction temperature; and
   (e) recovering the carboxyalkylinulin reaction product in a manner known per se.

2. The method in accordance with claim 1 wherein the halogenoalkylcarboxylate in step (a) represents from 70% to 100 molar-% and wherein the slurry (b) contains from 40% to 60% by weight of inulin.

3. The method in accordance with claim 1 wherein the molar ratio of halogenoalkylcarboxylate:inulin in step (c) is the range of from 1.5 to 4.5.

4. The method in accordance with claim 1 wherein the slurry (b) is heated to a temperature in the range of from 70° C. to 90° C.

5. The method in accordance with claim 4 wherein the pH of the reaction mixture in step (c) is in the range of from 9.5 to 11.5.

6. The method in accordance with claim 4 wherein the reaction is continued for a period of from 20 to 60 minutes after all the reagents have been added.

7. The method in accordance with claim 1 wherein the alkyl moiety in the carboxyalkylinulin is represented by a carbon chain having from 1 to 3 carbon atoms.

8. The method in accordance claim 1 wherein the slurry (b) is heated to a temperature in the range of from 75° C. to 85° C.

9. The method in accordance with claim 1 wherein the carboxyalkylinulin is carboxymethylinulin.

10. The method in accordance with claim 1 wherein the aqueous medium in step (a) contains from about 10% to about 30%-by weight of the inulin.

* * * * *